(12) United States Patent
Scheetz

(10) Patent No.: US 7,641,006 B2
(45) Date of Patent: Jan. 5, 2010

(54) MILITARY VEHICLE WITH ELECTRIC DRIVE RUNNING GEAR SYSTEM

(75) Inventor: Timothy R. Scheetz, Peoria, IL (US)

(73) Assignee: Scheetz Inc., Peoria, IL (US)

(*) Notice: Subject to any disclaimer, the term of this patent is extended or adjusted under 35 U.S.C. 154(b) by 395 days.

(21) Appl. No.: 11/457,387

(22) Filed: Jul. 13, 2006

(65) Prior Publication Data

US 2008/0258549 A1    Oct. 23, 2008

Related U.S. Application Data

(63) Continuation-in-part of application No. 11/068,543, filed on Feb. 28, 2005, now Pat. No. 7,267,414, which is a continuation of application No. 10/608,656, filed on Jun. 27, 2003, now Pat. No. 6,860,571.

(60) Provisional application No. 60/392,155, filed on Jun. 27, 2002.

(51) Int. Cl.
*B62D 55/06* (2006.01)
(52) U.S. Cl. ............ 180/9.5; 180/9.54; 180/9.56; 305/129; 305/130; 305/131; 305/134; 305/141
(58) Field of Classification Search ............ 180/9.5, 180/9.54, 9.56; 305/129, 130, 131, 134, 305/141, 143
See application file for complete search history.

(56) References Cited

U.S. PATENT DOCUMENTS

| | | | | |
|---|---|---|---|---|
| 1,297,104 A | * | 3/1919 | Colahan | 305/134 |
| 1,340,789 A | * | 5/1920 | Ollivier | 180/9.28 |
| 2,374,240 A | * | 4/1945 | Shankman | 180/9.62 |
| 2,461,849 A | * | 2/1949 | Slemmons et al. | 305/171 |
| 2,613,892 A | * | 10/1952 | Dever | 244/100 C |
| 3,566,825 A | * | 3/1971 | Ruf | 180/6.54 |
| 3,842,785 A | * | 10/1974 | Rivet | 440/12.64 |
| 4,087,135 A | * | 5/1978 | Unruh | 305/125 |
| 4,253,536 A | | 3/1981 | Braathen et al. | |
| 4,448,273 A | * | 5/1984 | Barbieri | 180/9.21 |
| 4,781,257 A | * | 11/1988 | Gee et al. | 180/9.5 |
| 4,834,478 A | * | 5/1989 | Stevens et al. | 305/124 |
| 4,881,609 A | * | 11/1989 | Purcell et al. | 180/9.5 |

(Continued)

OTHER PUBLICATIONS

PCT International Search Report for PCT/US07/73493.

*Primary Examiner*—Lesley D Morris
*Assistant Examiner*—Michael R Stabley
(74) *Attorney, Agent, or Firm*—Thompson Coburn LLP; Kevin M. Kercher, Esq.

(57) ABSTRACT

A military vehicle, e.g., tank, that includes a turret, a gun mounted on the turret, a plurality of belts, wherein each of the plurality of belts encompass a front wheel and a rear wheel to provide a positive belt drive system for rotating the belt, at least one suspension system for absorbing load stresses, each suspension system having a suspension cylinder that is operatively and pivotably mounted to a military vehicle frame pivot on a main frame of the military vehicle, at least one belt tensioning system for maintaining tension on the plurality of belts, by moving the axle of the at least one of the front wheel or the rear wheel in a horizontal direction, and at least one electric drive system that includes electric drive motors for rotation of the at least one of the front wheel and the rear wheel and braking.

29 Claims, 13 Drawing Sheets

U.S. PATENT DOCUMENTS

| | | | |
|---|---|---|---|
| 4,957,332 A * | 9/1990 | Batelaan | 305/185 |
| 5,183,287 A * | 2/1993 | VanSweden | 280/124.129 |
| 5,279,378 A * | 1/1994 | Grawey et al. | 180/9.21 |
| 5,286,044 A | 2/1994 | Satzler et al. | |
| 5,505,274 A * | 4/1996 | Satzler | 180/9.5 |
| 5,622,234 A * | 4/1997 | Nagorcka et al. | 180/9.5 |
| 5,901,959 A | 5/1999 | Tessiot | |
| 5,975,226 A * | 11/1999 | Matsumoto et al. | 180/9.34 |
| 6,283,241 B1 * | 9/2001 | Kubota | 180/193 |
| 6,315,374 B1 * | 11/2001 | Johansson | 305/145 |
| 6,557,953 B1 * | 5/2003 | Kahle et al. | 305/135 |
| 6,652,043 B2 * | 11/2003 | Oertley | 305/137 |
| 6,715,575 B2 * | 4/2004 | Karpik | 180/193 |
| 7,343,991 B2 | 3/2008 | Rittenhouse | |
| 7,455,131 B2 | 11/2008 | Rittenhouse | |
| 2002/0156574 A1 * | 10/2002 | Fortin | 701/213 |

* cited by examiner

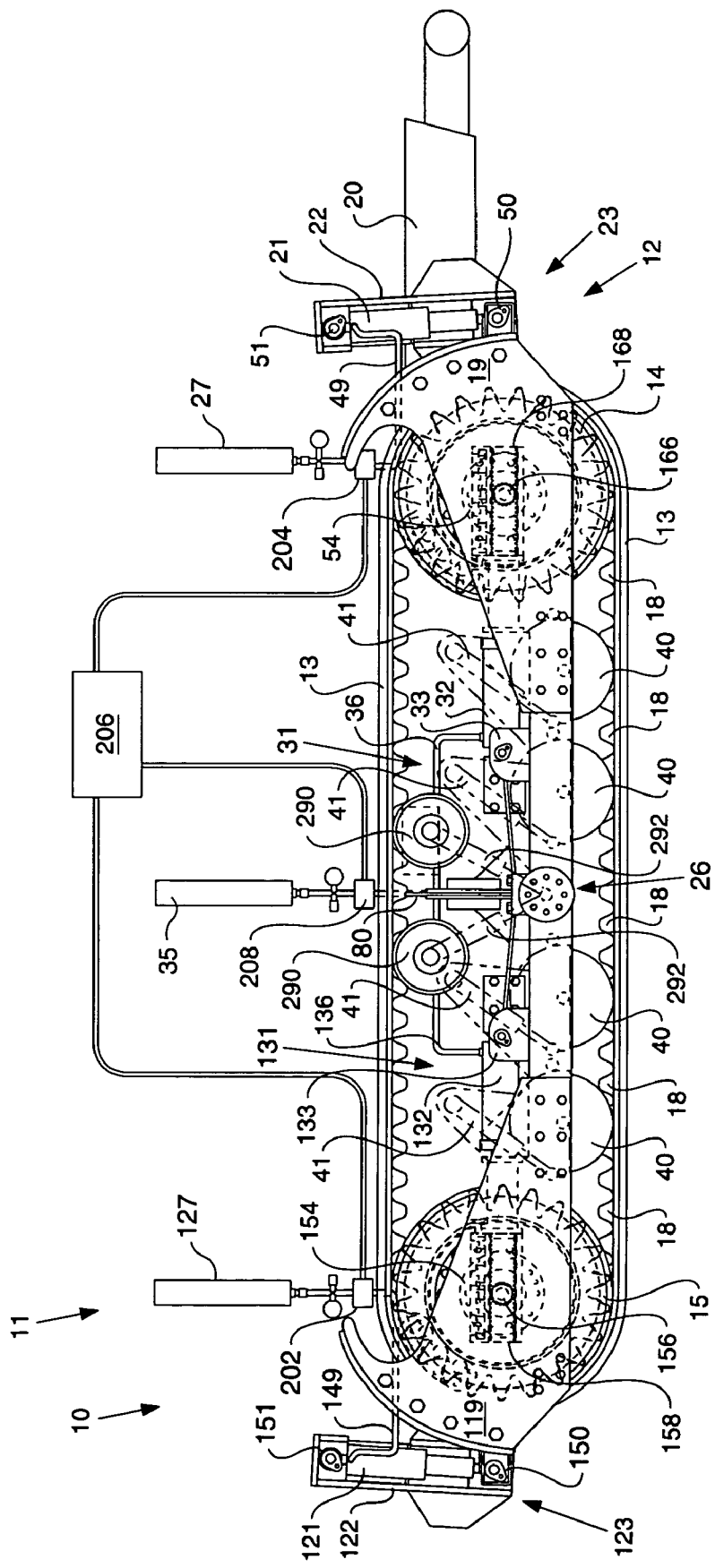

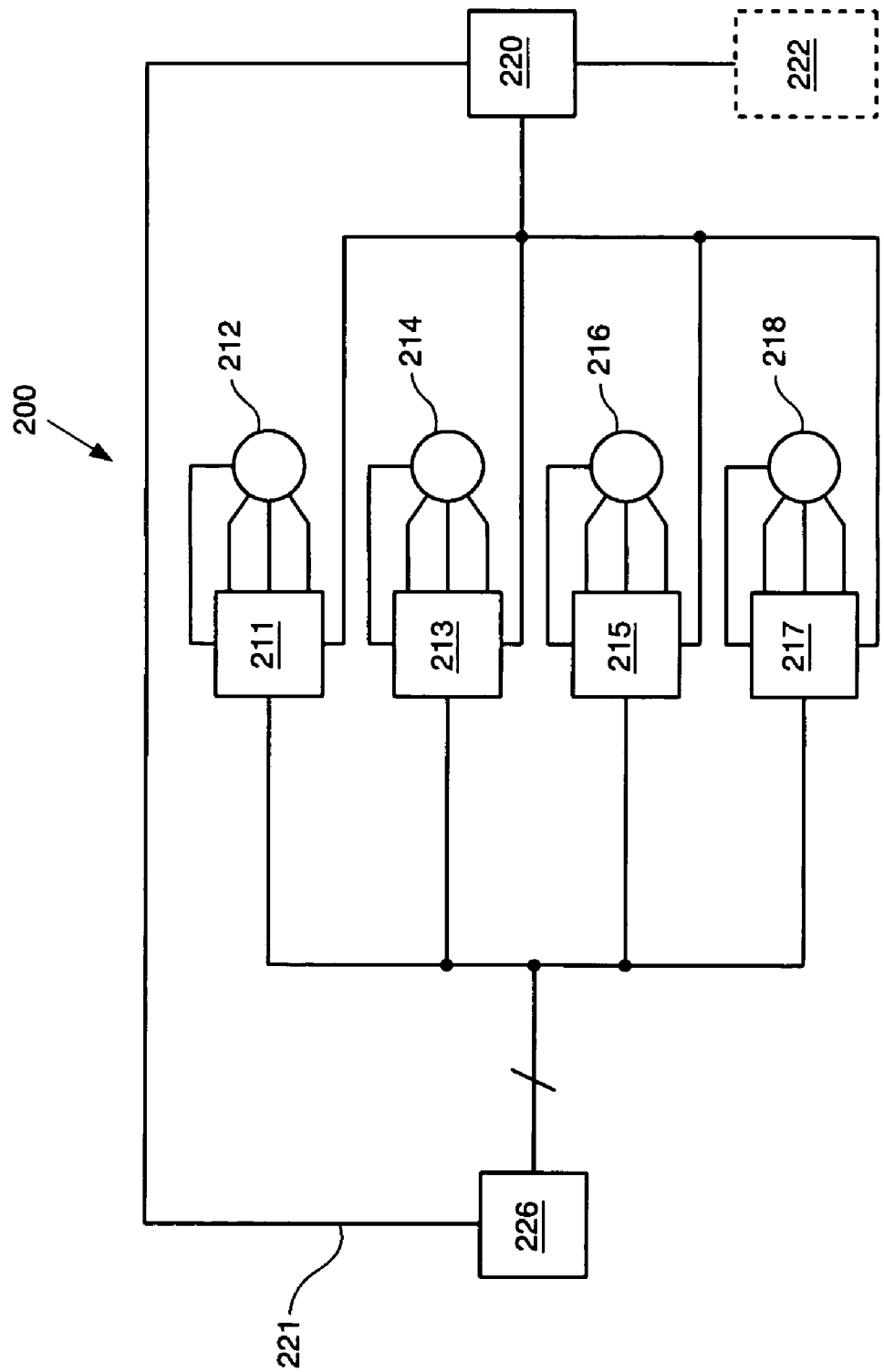

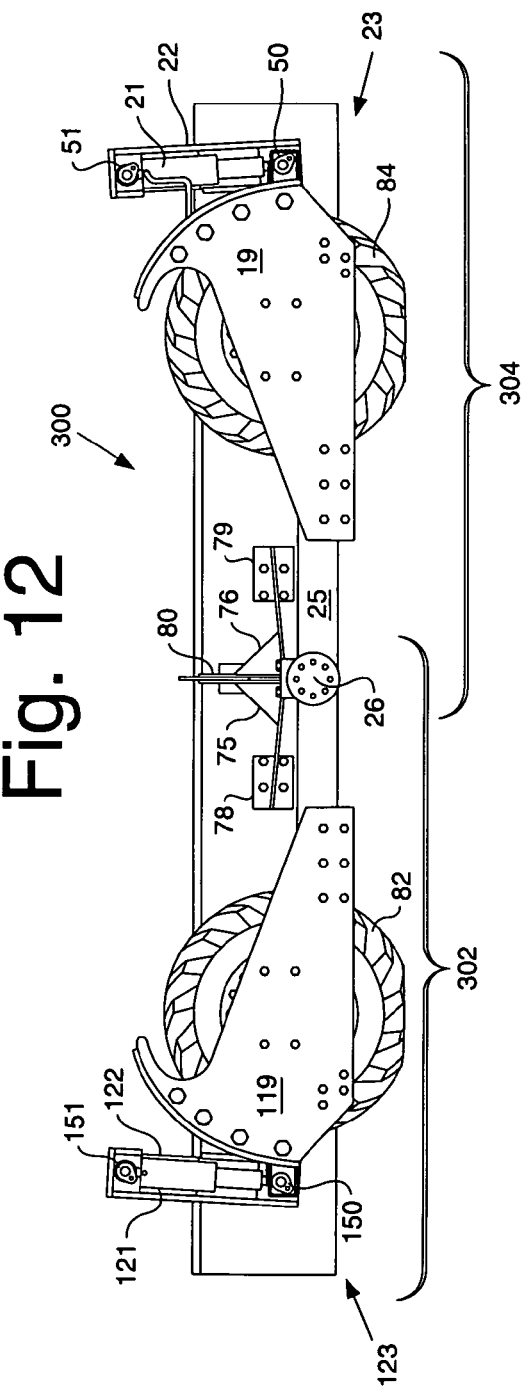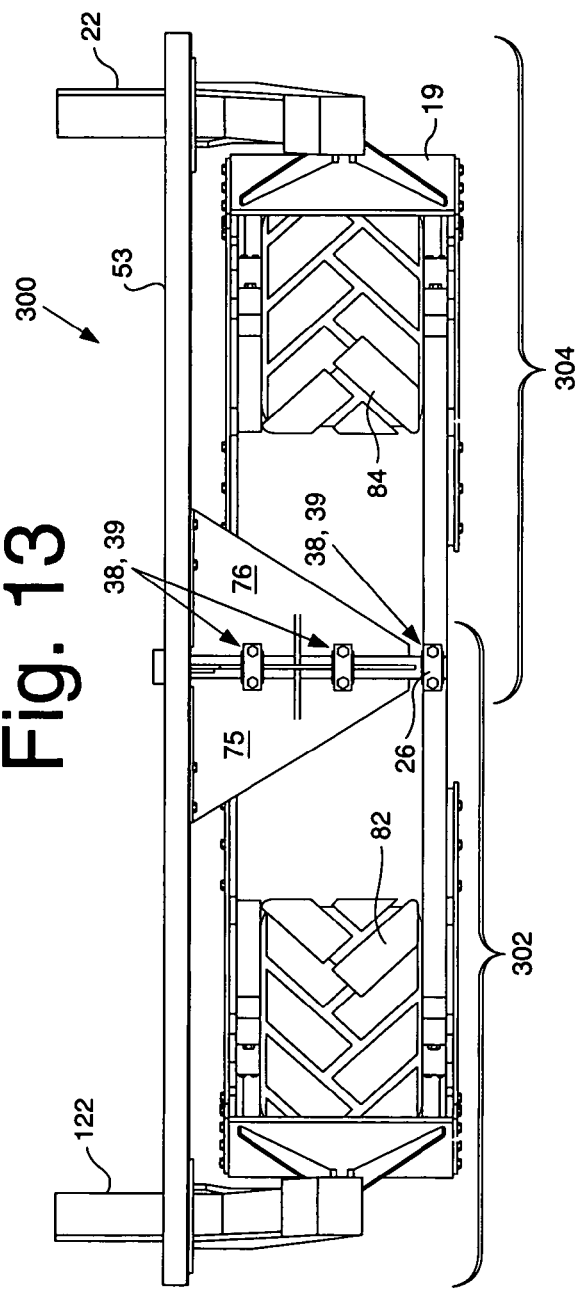

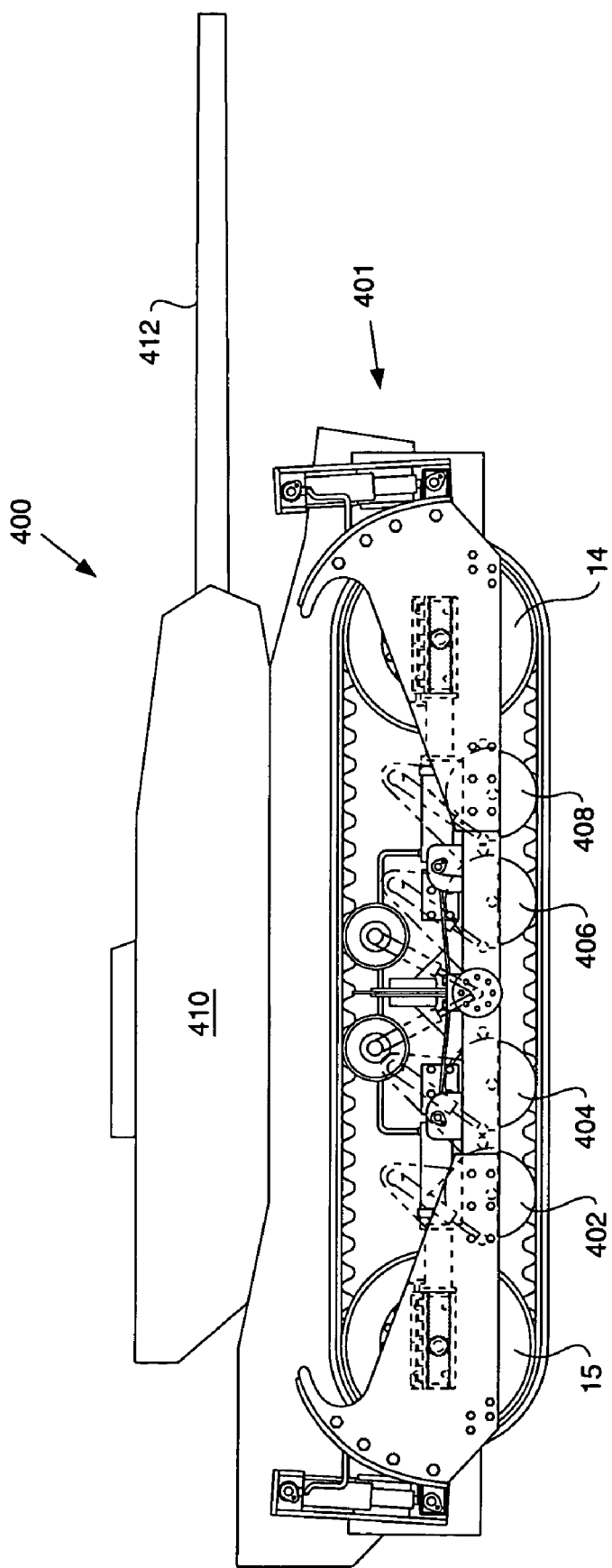

MILITARY VEHICLE WITH ELECTRIC DRIVE RUNNING GEAR SYSTEM

CROSS-REFERENCE TO RELATED APPLICATION

This patent application continuation-in-part of U.S. patent application Ser. No. 11/068,543, filed Feb. 28, 2005, now U.S. Pat. No. 7,267,414, incorporated herein by reference, which is a continuation of U.S. patent application Ser. No. 10/608,656, filed Jun. 27, 2003, incorporated herein by reference, now U.S. Pat. No. 6,860,571, incorporated herein by reference, which claims the benefit of U.S. Provisional Application Ser. No. 60/392,155, filed on Jun. 27, 2002.

BACKGROUND OF INVENTION

The hybrid-electric drives offer potential benefits over conventional mechanical drives in terms of reduced fuel consumption, reduced emissions, and the utilization of smaller engines. For a military vehicle, e.g., tank, this can provide a significant advantage since with lower fuel requirements, the military vehicle will be able to travel further to either reach a target or be able to flee to safety. Also, the current weight of some military vehicles is a problem. Currently, tanks like the Abrams, M1 and others are about sixty (60) tons in weight. There are tremendous advantages with regard to mobility in combat if the military vehicle can be one-half or one-third of the weight of a current military vehicle.

A major problem with current military vehicles, e.g., tanks, which utilize tracks or drive belts, is that during combat, these tracks or drive belts can be dislodged. This renders the military vehicle a sitting target due to the fact that the tank is now completely immobilized. The operators of the tank then have to flee and in the process expose themselves to enemy fire and possible capture. This "mobility kill" is a significant problem for our armed forces that needs to be addressed.

Also, present day track systems utilized in tanks have problems regarding how to drive such tracks with the entrained wheels, how to maintain structural integrity of the track and wheels, how to encompass the track in lateral alignment with the wheels when the wheels are subjected to large obstacles in the road, how to provide long life for the track and wheels, how to accommodate debris ingested between the track and belt while maintaining the driving relationship therebetween without damaging either, how to preclude the track from coming off the wheels, how to brake the track and wheel systems, how to preclude the track from coming off of the wheels during braking, and how to maintain proper belt tension during braking and turning.

Current positive drive belt systems usually have only one wheel positively engaged with the belt causing premature wear when braking occurs. Furthermore, known positive drive belt systems provide insufficient recoil to allow foreign material to escape from the belt system.

In addition, track driven systems are "hard" riding. Specifically, track driven systems lack suspension systems entirely or have primitive suspension systems resulting in a rough ride.

The present invention is directed to overcome one or more of the problems as set forth above.

SUMMARY OF INVENTION

In one aspect of this invention, a military vehicle, e.g., tank, is disclosed. This military vehicle includes a turret, a gun mounted on the turret, a plurality of belts, wherein each of the plurality of belts encompass a front wheel and a rear wheel to provide a positive belt drive system for rotating the belt, wherein the belt has a ground engaging surface and a wheel engaging surface, the wheel engaging surface having lugs thereon for mating with the apertures in the front wheel and the rear wheel such that when the drive wheel rotates, the belt is positively driven, at least one suspension system for absorbing load stresses, each suspension system having a suspension cylinder that is operatively and pivotably mounted to a military vehicle frame pivot on a main frame of the military vehicle, at least one of the front wheel and the rear wheel rotatably mounted between a first side and a second side of a lower suspension bracket such that when the at least one of the front wheel and the rear wheel encounters an object or depression, the lower suspension bracket moves in a vertical direction and pivots about the track frame pivot thereby allowing the at least one of the front wheel and the rear wheel to move vertically without moving the main frame proportionally vertical, and vertical movement of the at least one of the front wheel and the rear wheel is dampened by the suspension cylinder, at least one belt tensioning system for maintaining tension on the plurality of belts, each of the plurality of belt tensioning system having a track tension cylinder operatively mounted between an axle of the at least one of the front wheel or the rear wheel and the main frame, wherein the track tension cylinder maintains tension on the belt by moving the axle of the at least one of the front wheel or the rear wheel in a horizontal direction, and at least one electric drive system, wherein the electric drive system includes a plurality of electric drive motors, each electric drive motor is operatively attached to the at least one of the front wheel and the rear wheel for rotation of the at least one of the front wheel and the rear wheel and braking when electric power is removed from the plurality of electric drive motors.

In another aspect of this invention, there are a plurality of middle rollers rotatably mounted to a main frame and between the front wheel and the rear wheel and extending below the main frame and a plurality of carrier rollers rotatably mounted to the main frame and between the front wheel and the rear wheel and extending above the main frame.

In still another aspect of this invention, there are front wheels and the rear wheels that each include a circumference with retractable paddles that are compressed when a track is positioned around the circumference of the front wheels and the rear wheels and extended when the track is removed for engagement into the earth for movement therein.

In yet another aspect of this invention, the suspension cylinder includes a suspension piston rod at a first end operatively attached to an upper suspension bracket, the upper suspension bracket operatively attached to the main frame, and wherein the suspension cylinder has a distal end operatively attached to the lower suspension bracket such that when the at least one of the front wheel or the rear wheel encounters an object, the suspension cylinder dampens vertical movement of the front wheel or the rear wheel.

Yet still another aspect of this invention includes a side thrust bearing operatively attached to the lower suspension bracket and an inside support for precluding side bearing thrust movement but allowing vertical movement.

Another aspect of this invention is that the at least one belt tensioning system includes at least one belt tensioning system includes at least one front pinion movable within at least one front rack, wherein the at least one front pinion is operatively connected to a front axle and a front, lower suspension bracket and wherein the at least one belt tensioning system includes at least one rear pinion movable within at least one rear rack, wherein the at least one rear pinion is operatively connected to a rear axle and the rear, lower suspension bracket.

Still another aspect of this invention is that the front axle can spin freely within a first bearing assembly and the rear axle can spin freely within a second bearing assembly.

Yet another aspect of this invention an electric drive that is electrically connected to an electric motor and the plurality of electric drive systems are electrically connected to at least one generator and at least one controller with an optional user interface electrically connected to the controller.

Another aspect of this invention is that each suspension system of the at least one suspension system is operatively connected to a controller that is electrically connected to a processor for controlling the amount of pressure in the suspension cylinder.

A further aspect of this invention is that each belt tensioning system of the at least one belt tensioning system is operatively connected to a controller that is electrically connected to a processor for controlling the amount of pressure in the track tension cylinder.

Another aspect of this invention is that a combination of the at least one suspension system and the at least one belt tensioning system operates as a road arm to provide movement in both a vertical and horizontal direction.

Yet still another aspect of this invention includes that the front wheels and the rear wheels being attached to a drive system of the plurality of drive systems though an in-hub connection so that if at least one belt of the plurality of belts were dislodged, mobility of the military vehicle would still be still possible.

Yet still another aspect of this invention includes the front wheels and the rear wheels forming a plurality of wheel stations.

Still another aspect of this invention includes that the plurality of wheel stations is selected from the group consisting of five wheel stations or six wheel stations.

Yet still another aspect of this invention includes that the turret is a rotatable turret and the gun is a heavy gun.

Still another aspect of this invention includes a tank that has a weight in a range from about twenty tons to about thirty tons.

Another aspect of this invention includes an independent suspension for use in conjunction with a positive drive belt system, belt tensioner adapted for use with a positive drive belt system, drive wheel for use in conjunction with a positive drive belt system, and positive braking system for use with a positive drive belt system.

Still another aspect of this invention further includes an independent suspension system, a positive drive system, and a belt tensioner system for use on a track system.

In another aspect of this invention, a military vehicle, e.g., tank, is disclosed. This military vehicle includes a turret, a gun mounted on the turret, a plurality of belts, wherein each of the plurality of belts encompass a front wheel and a rear wheel to provide a positive belt drive system for rotating the belt, wherein the belt has a ground engaging surface and a wheel engaging surface, the wheel engaging surface having lugs thereon for mating with the apertures in the front wheel and the rear wheel such that when the drive wheel rotates, the belt is positively driven, and at least one electric drive system, wherein the electric drive system includes a plurality of electric drive motors, each electric drive motor is operatively attached to the least one of the front wheel and the rear wheel for rotation of the least one of the front wheel and the rear wheel and braking when electric power is removed from the plurality of electric drive motors.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which:

FIG. 2 is a side view according to FIG. 1 but with phantom lines illustrating hidden components of the track driven device, e.g., military vehicle;

FIG. 11 is a schematic diagram of an electric drive system associated with the present invention;

FIG. 12 is a side view of a lower section of a wheel driven device, e.g., military vehicle, having a suspension system, a belt tensioner system, and an electric drive running gear system thereon to the present invention;

FIG. 13 is a top view according to FIG. 12 of a lower section of a wheel driven device, e.g., military vehicle, having a suspension system, the belt tensioner system, and the electric drive running gear system according to the present invention;

FIG. 18 is a military vehicle, e.g., tank, having a rotatable turret and gun along with a suspension system, belt tensioner system, and electric drive running gear system according to FIG. 12 of the present invention.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. Additionally, the present invention contemplates that one or more of the various features of the present invention may be utilized alone or in combination with one or more of the other features of the present invention.

The present invention can be applied to a wide variety of military vehicles. One particular illustrative, but nonlimiting, embodiment includes a tank, which for the purposes of this patent application includes any type of tracked land vehicle that includes a turret with a mounted and preferably rotatable gun.

Figure 1:
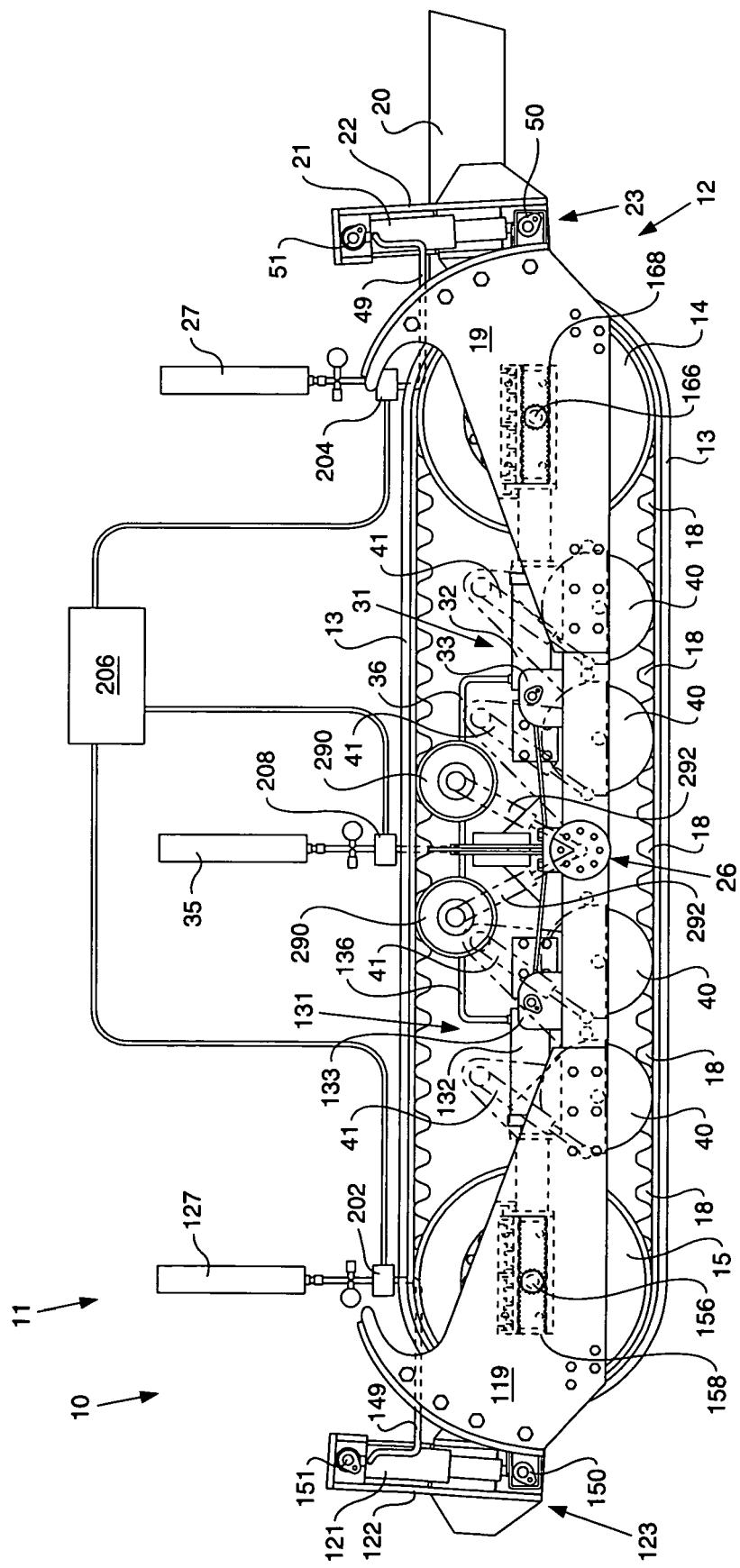
FIG. 1 is a side view of a lower section of a track driven device, e.g., military vehicle, having a suspension system, a belt tensioner system, and an electric drive running gear system according to the present invention.

Referring now to the drawings, wherein like reference numerals designate identical or corresponding parts throughout the several views, FIGS. 1 and 2 illustrate a lower section 11 of a track driven device 10, e.g., military vehicle. The track driven device 10, e.g., military vehicle, has two belts 13 each encompassing a lug engaged rear wheel 15 and a lug engaged front wheel 14.

Referring now to FIG. 11, an electric drive system is generally indicated by numeral 200. In the preferred, but nonlimiting embodiment, there is a first electric drive motor 212 electrically connected to a first electric drive 211, a second electric drive motor 214 electrically connected to a second electric drive 213, a third electric drive motor 216 electrically connected to a third electric drive 215 and a fourth electric drive 217 electrically connected to a fourth electric drive motor 218. The electric drives 211, 213, 215 and 217 are electrically connected to a generator 226 and a system controller 220. There is preferably a user interface 222 for operating the system controller 220. In an illustrative, but nonlimiting, example, the power rating is Five Hundred (500) Horsepower for the electric drive system 200. The electric motor drives 211, 213, 215 and 217 are preferably, but not necessarily, independent with an illustrative input voltage of 489 Volts AC at 60 Hz and range from about 160 Volts AC to about 528 Volts AC on Volts/Hz curve. The electric drive motors 212, 214, 216, and 218 are preferably, but not necessarily, brushless DC or AC Vector with a motor speed range of 1000:1. The feedback for the drives is preferably, but not necessarily, resolver feedback. The system controller 220 is preferably, but not necessarily, a main controller with user input and output, i.e., I/O, and can be electrically connected to the generator 226 via a data line 221. The generator 226 can provide three phase AC power to the electric motor drives 211, 213, 215 and 217. Electronic braking can be provided via a dB external resistor. Also, by reversing the voltage from the controller 220 to the electric motor drives 211, 213, 215 and 217 provides braking by reversing the direction of the electric drive motors 212, 214, 216, and 218. The first and second electric motors 212 and 214 power and brake the lug engaged rear wheels 15 to drive the belts 13 and the third and fourth electric motors 216 and 218 power and brake the lug engaged front wheels 14 to drive the belts 13. Illustrative, but nonlimiting, examples of electric drives of this type are available from Custom Power Technology, Inc. having a place of business at N93 W14605 Whittaker Way, Menomonee Falls, Wis. 53051.

Although a two wheel station embodiment is described in FIGS. 1 and 2 indicated by numeral 10 with middle rollers 40, a five wheel station or six wheel station embodiment is preferred for a typical military vehicle application, e.g., tank, which is shown in FIG. 18 and generally indicated by numeral 400. The electric drive running gear system for a tank is generally indicated by numeral 401. However, the number of electric motor drives and electric drive motors will need to be increased accordingly. The first wheel station is indicated by first lug engaged rear wheel 15, a second wheel station is indicated a second lug engaged wheel 402, a third wheel station is indicated a third lug engaged wheel 404, a fourth wheel station is indicated a fourth lug engaged wheel 406, a fifth wheel station is indicated a fourth lug engaged wheel 408, and a sixth wheel station is indicated by a sixth lug engaged front wheel 14. Positioned on top of the electric drive running gear system 401 is a turret 410 that is preferably rotatable. Mounted on the turret 410 is a gun 412. Any of a wide variety of available guns will suffice. For example, modern tank guns can include, but are not limited to, a large caliber high-velocity gun, a machine gun, a high explosive anti-tank gun, an automatic cannon and a guided missile.

Figure 4:
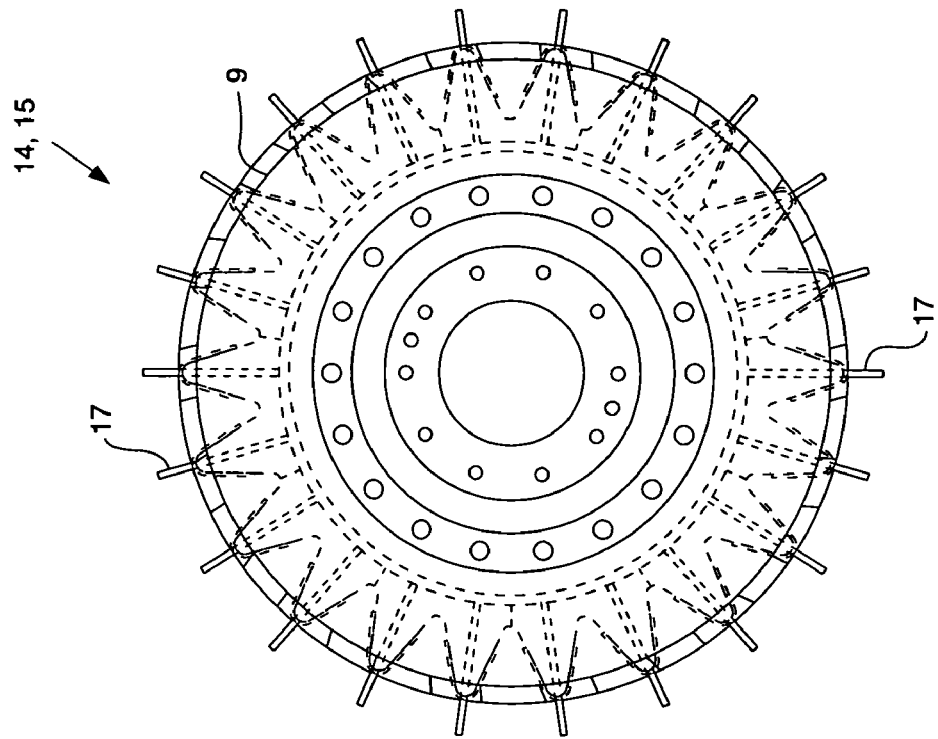
FIG. 4 is a side view of the wheel shown in FIG. 3 for the track driven device, e.g., military vehicle.
Figure 3:
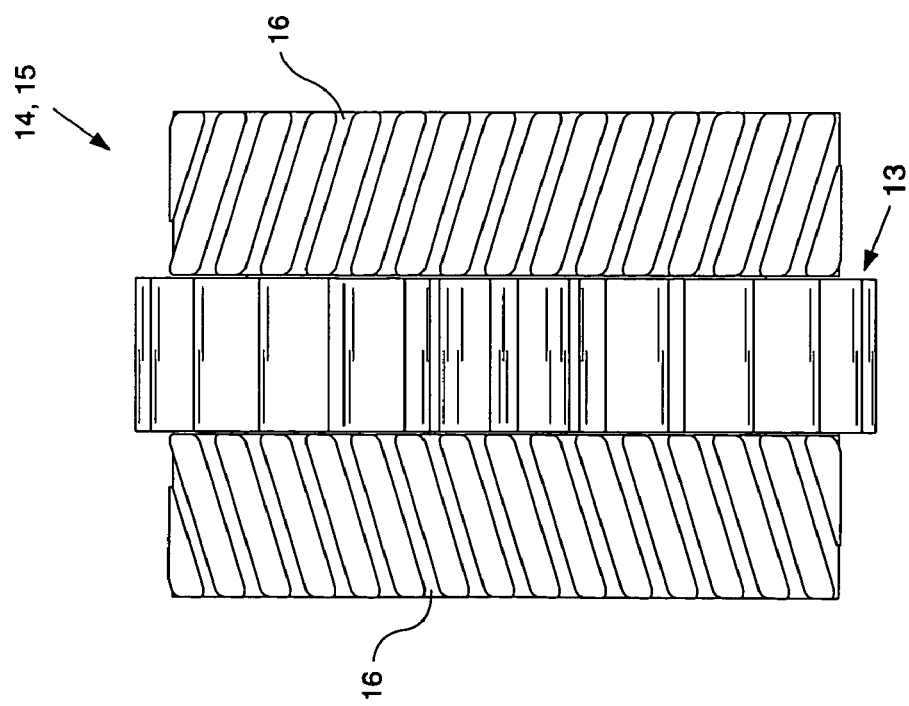
FIG. 3 is a front view of a wheel for the track driven device, e.g., military vehicle, shown in FIGS. 1 and 2.

Referring now to FIGS. 3 and 4, the lug engaged front wheels 14 and the lug engaged rear wheels 15 are shown. The lug engaged front wheels 14 and the lug engaged rear wheels 15 preferably include a series of paddles 17. The series of paddles assist in mud and sand and allow the vehicle to keep moving. Also, the paddles 17 protrude out of the lug engaged front wheels 14 and the lug engaged rear wheels 15 for a "mobility kill" if the belts 13, shown in FIG. 3, become lost. The lug engaged front wheels 14 and the lug engaged rear wheels 15 each having a circumference 9 with retractable paddles 17 that are compressed when a belt 13 is positioned around the circumference 9 of the lug engaged front wheels 14 and the lug engaged rear wheels 15 and extended therefrom when the belt 13 is removed for engagement into the earth for movement therein. The lug engaged front wheels 14 and the lug engaged rear wheels 15 also have front windows or openings 16 in the circumference. In an alternative embodiment, side windows (not shown) are provided in the side of the lug engaged front and rear wheels 14, 15. The windows 16 allow snow, ice, soil, rocks and other foreign matter to pass freely during operation. In addition, the front windows 16 are used to receive lugs 18 on belts 13, which are best illustrated in FIGS. 1 and 2. The lugs 18 enter the front windows 16 in much the same way that meshing gears interact with one another. As the lug engaged wheels 14, 15 rotate, the lugs 18 mate with the front windows 16, and the belts 13 are positively driven by the lug engaged wheels 14, 15.

In an alternative embodiment, there are no windows 16 in the lug engaged wheels 14, 15. Rather, the lug engaged wheels 14, 15 and the lugs 18 mate in much the same way as two gears mesh.

Referring again to FIGS. 1 and 2, a suspension system 12 is operatively mounted to each side of the lower sections 11 of the track driven device 10, e.g., military vehicle. The suspension systems 12 provide independent suspension for the belts 13. The suspension systems 12 absorb load stresses and allow the lug engaged wheels 14, 15 to move vertically when an object is encountered providing a more comfortable, controlled and safe ride while prolonging the life of the track driven device 10, e.g., military vehicle such as a tank.

Although it is understood that the track driven device 10, e.g., military vehicle, has two belts 13 and two suspension systems 12, the description that follows describes one side of the track driven device 10, e.g. military vehicle. Referring in combination to FIGS. 1 and 2, the suspension system 12 has a front, lower suspension bracket 19 and rear, lower suspension bracket 119.

The front, lower suspension bracket 19 has front ends 23 that are operatively connected to a frame 20 of the track driven device 10, e.g., military vehicle, via a front suspension cylinder 21 and a front, upper suspension bracket 22. The front suspension cylinder 21 has a first end 50 operatively attached to the front, lower suspension bracket 19 and a second end 51 operatively attached to the front, upper suspension bracket 22. The front, upper suspension bracket 22 is operatively attached to the frame 20.

Figure 7:
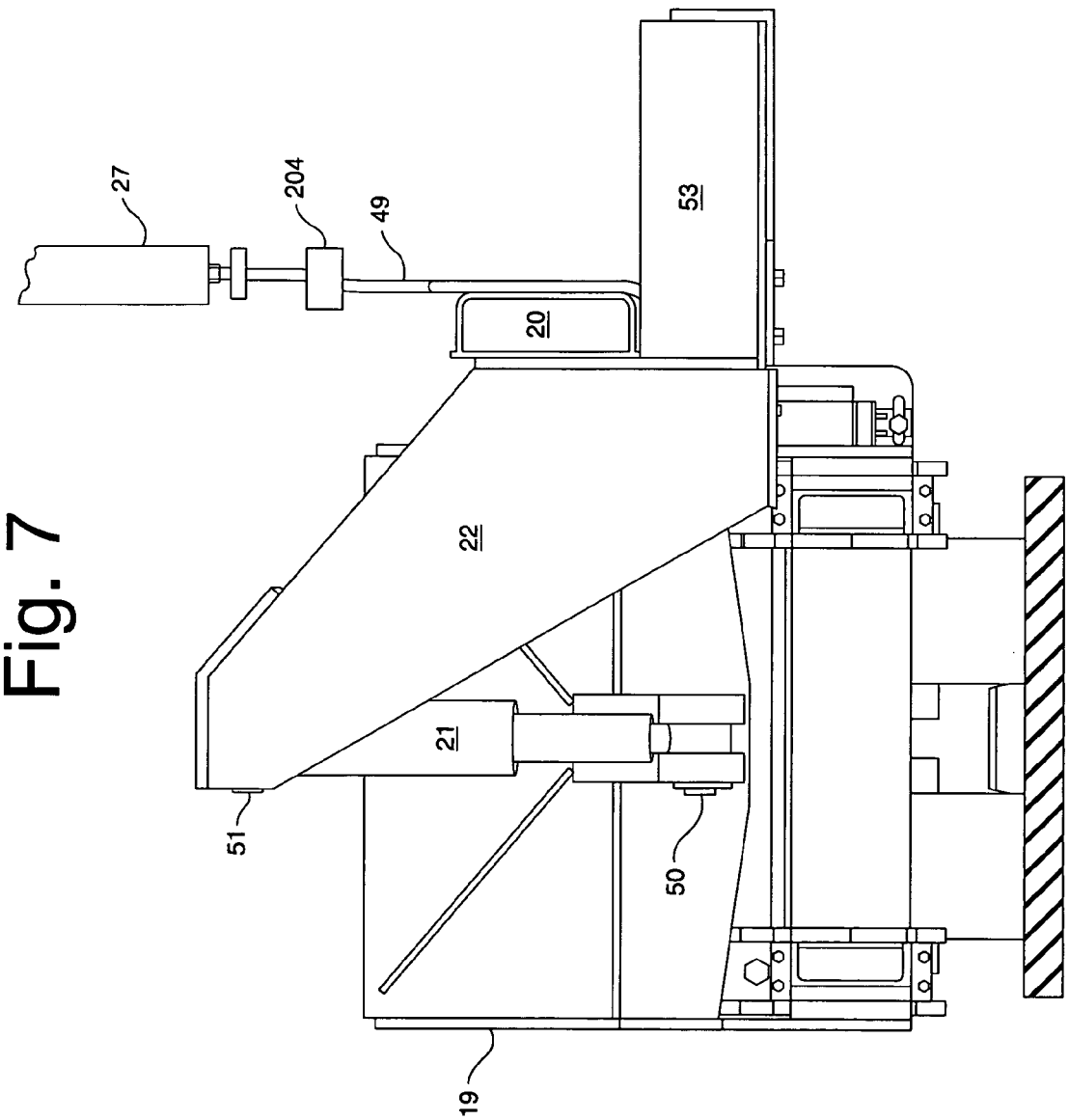
FIG. 7 is a front view of one side of the track driven device, e.g., military vehicle, having the suspension system, the belt tensioner system, and the electric drive running gear system according to FIG. 1.
Figure 8:
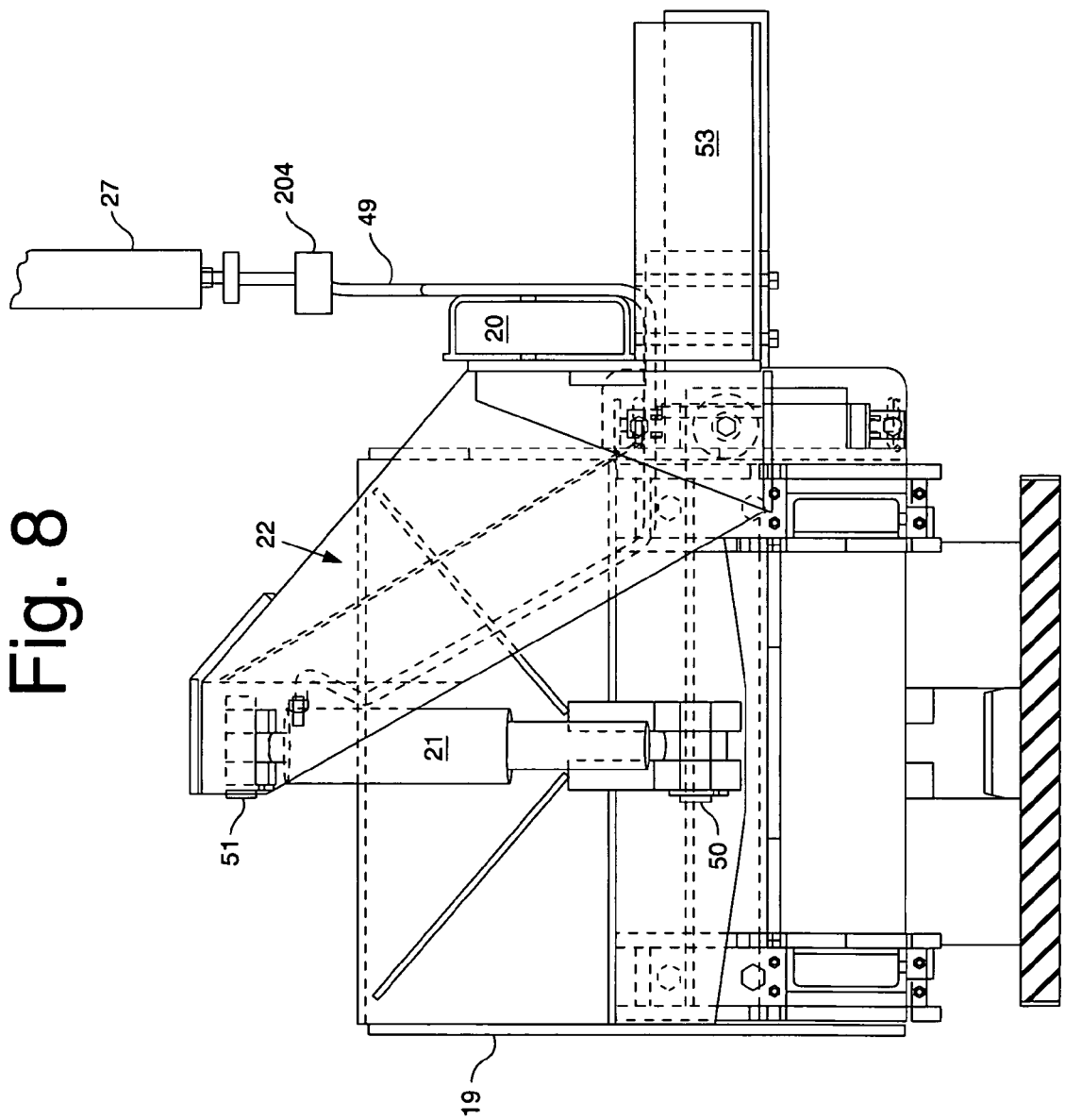
FIG. 8 is a front view of one side of the track driven device, e.g., military vehicle, having the suspension system, the belt tensioner system, and the electric drive running gear system according to FIG. 7 but with phantom lines illustrating hidden components of the track driven device, e.g., military vehicle.

The rear, lower suspension bracket 119 has rear ends 123 that are operatively connected to a frame 20 of the track driven device 10, e.g., military vehicle, via a rear suspension cylinder 121 and a rear, upper suspension bracket 122. The rear, suspension cylinder 121 has a first end 150 operatively attached to the rear, lower suspension bracket 119 and a second end 151 operatively attached to the rear, upper suspension bracket 122. The rear, upper suspension bracket 122 is operatively also attached to the frame 20, as also shown in FIGS. 7 and 8.

Figure 5:
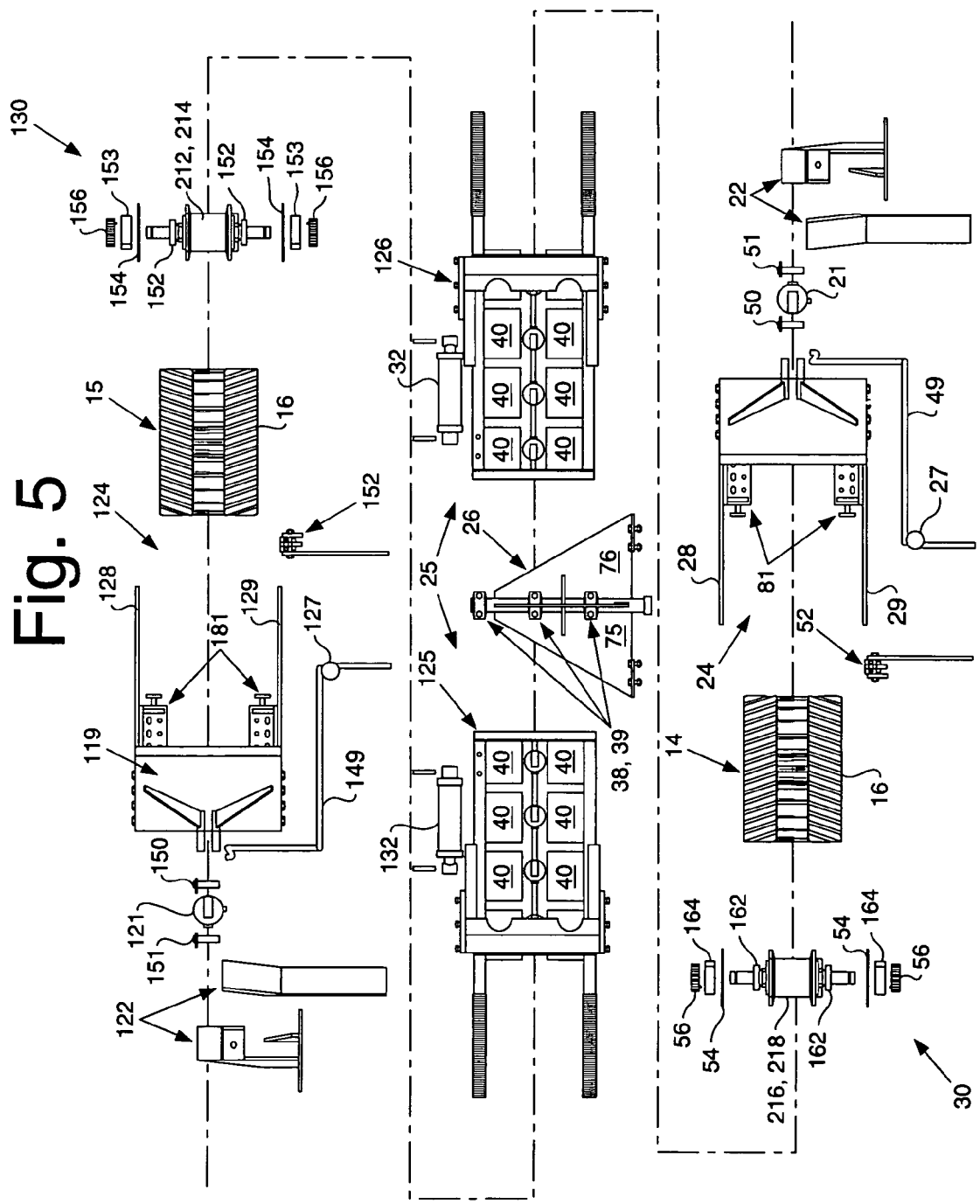
FIG. 5 is an exploded, top view of one side of the track driven device, e.g., military vehicle, having the suspension system, the belt tensioner system, and the electric drive running gear system according to FIG. 1.
Figure 6:
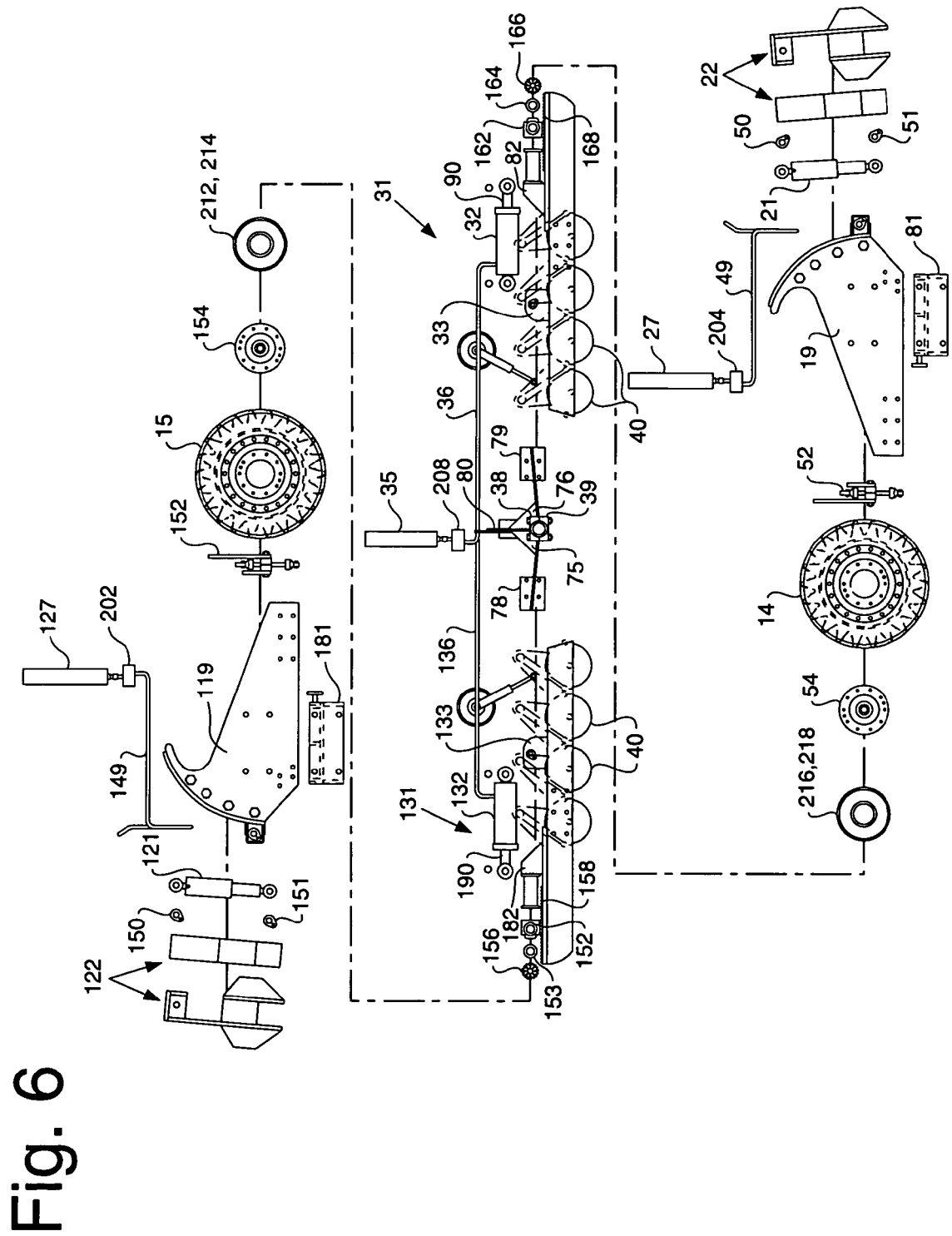
FIG. 6 is an exploded, side view of one side of the track driven device, e.g., military vehicle, having the suspension system, the belt tensioner system, and the electric drive running gear system according to FIG. 1.

Referring now to FIGS. 5 and 6, which illustrate the lug engaged rear wheel 15 rotatably mounted between a first side 128 and a second side 129 of the rear, lower suspension bracket 119 via an axle 130. The rear, lower suspension bracket 119 has distal ends 124 operatively attached to a rear portion 125 of a main frame 25. The main frame 25 is pivotally mounted to a track frame pivot 26.

The track frame pivot 26 is operatively attached to the main frame 25, which includes a rear frame portion 125 and a front frame portion 126. The track frame pivot 26 extends from one side of the main frame 25 to the other side for each suspension system 12. The track frame pivot 26 is operatively connected to the main frame 25 via a bearing cup 38 and a bearing cap 39 and includes a rear wing member 75 and a front wing member 76, which are secured by a rear mounting member 78 and a front mounting member 79, respectively. Both wing members 75 and 76 are secured to a vertical support member 80, as shown in FIG. 6.

Ends of the track frame pivot 26 ride in the bearing cup 38 and the bearing cap 39. To hold the track frame pivot 26 in place, the bearing cap 39 is bolted over the track frame pivot 26 to the bearing cup 38. In the preferred, but nonlimiting, embodiment, the bearing cap 39 and the bearing cup 38 are lined with neoprene rubber. The track frame pivot 26 is preferably a steel bar, however, other materials may be utilized.

The suspension cylinders 21, 121 are generally readily available and one such illustrative, but nonlimiting, cylinder is made by Caterpillar Industrial Products, Inc. in Peoria, Ill. under Part No. 151-1179. The suspension cylinders 21, 121 are each hydraulically connected to an accumulator 27, 127, respectively, via a suspension pressure line 49, 149, respectively, to provide suspension travel and load support. Preferably, the accumulators 27, 127 are high capacity nitrogen accumulators. The accumulators 27, 127 are available over-the-counter and one such accumulator is made by Caterpillar Industrial Products, Inc. in Peoria, Ill. under Part No. 7U5050. It is obvious to those with ordinary skill in the art that other cylinders and accumulators could be substituted for these specific cylinders and accumulators. The pressure in the suspension cylinders 21, 121 are each controlled by a regulator 204, 202, respectively, that is connected between the suspension cylinders 21, 121 and the accumulators 27, 127. The regulators are electrically connected to a controller, e.g., processor, 206, as shown in FIG. 1.

When the lug engaged front wheels 14 and/or the lug engaged rear wheels 15 encounter an object, the lug engaged front wheels 14 and/or the lug engaged rear wheels 15 move upwardly and the suspension cylinders 21, 121, respectively, absorb the initial shock of the object. During this upward movement, the suspension system 12 pivots about the track frame pivot 26. On the downward movement, the suspension cylinders 21, 121 preclude a rapid descent for a smooth ride.

Figure 9:
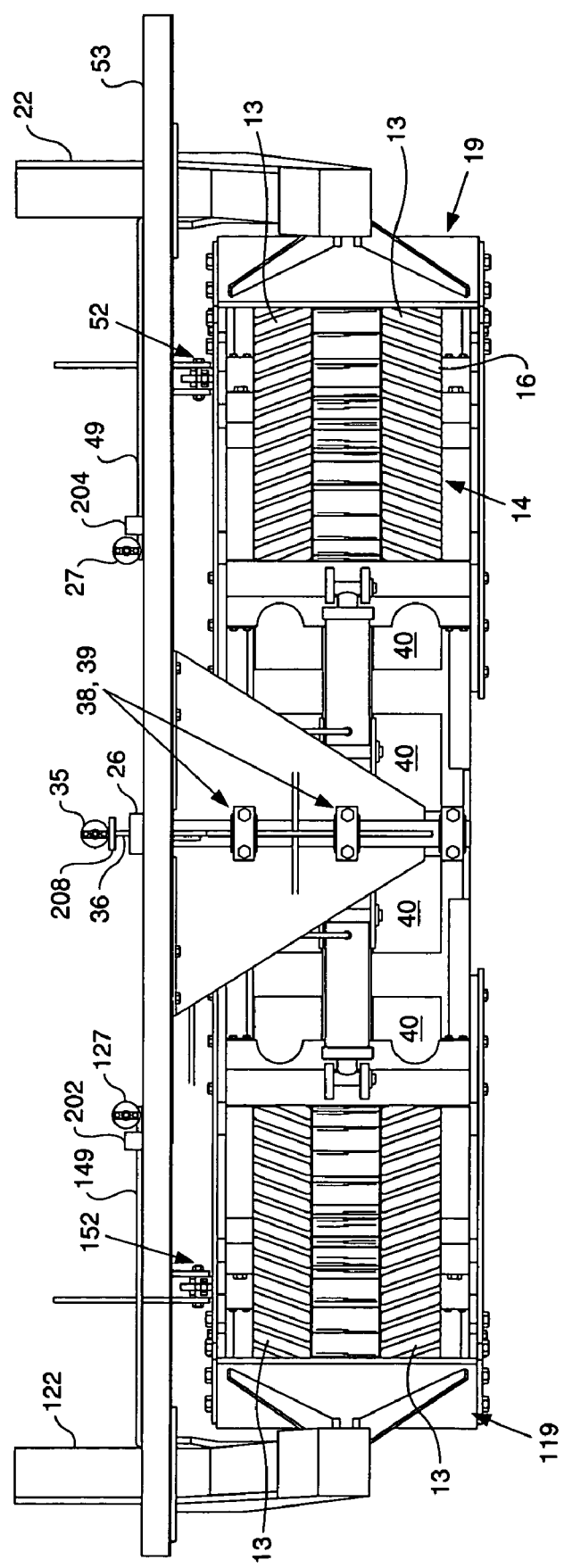
FIG. 9 is a top view of one side of the track driven device, e.g., military vehicle, having the suspension system, belt tensioner system, and electric drive running gear system according to FIG. 1.
Figure 10:
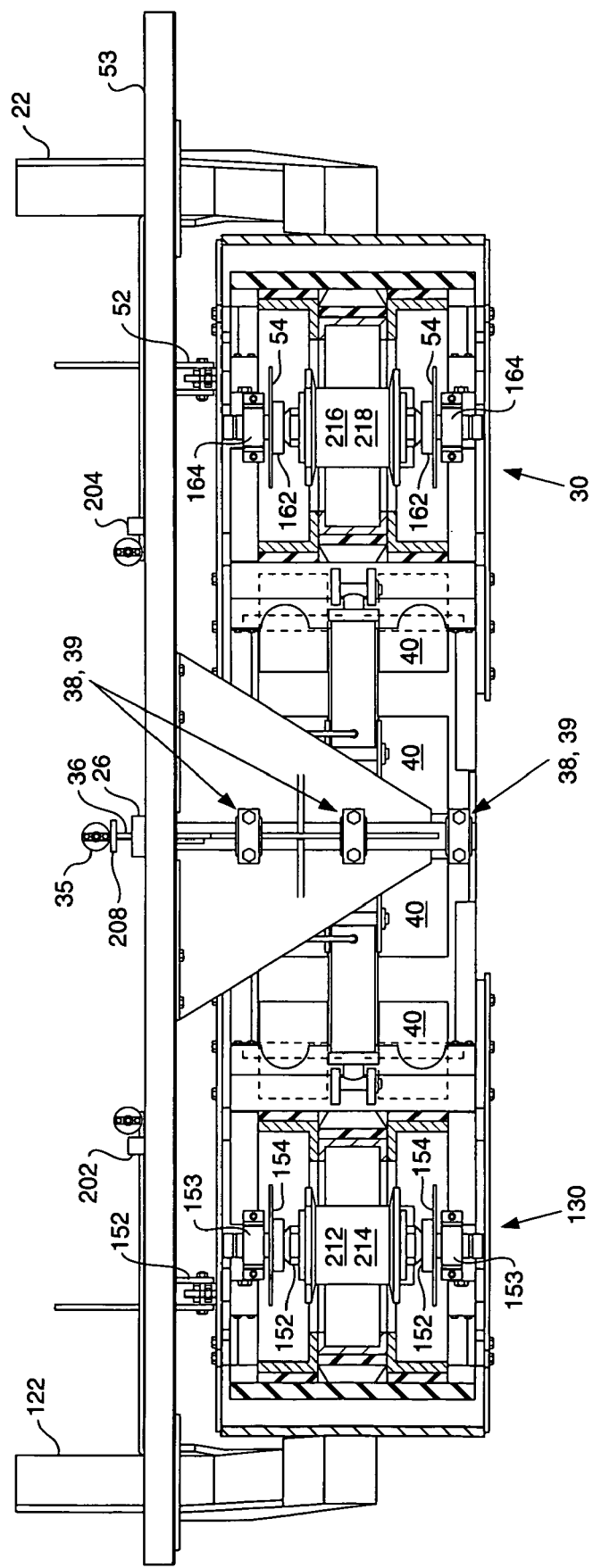
FIG. 10 is a top view of one side of the track driven device, e.g., military vehicle, having the suspension system, belt tensioner system, and electric drive running gear system according to FIG. 9 but with phantom lines illustrating hidden components of the track driven device, e.g., military vehicle.

FIGS. 9 and 10 show a roller bearing or side thrust bearings 52, 152, respectively, that are operatively attached between the front, lower suspension bracket 19 and rear, lower suspension bracket 119, respectively, and an inside support 53 to prevent side bearing thrust movement. The side thrust bearings 52, 152 allow the lower suspension brackets 19, 119 to move up and down pivoting about the track frame pivot 26. The side thrust bearings 52, 152 move up and down and keep the track frame 25 from moving.

Referring now to FIGS. 1, and 2, dual track belt tensioners 31, 131 are used to maintain tension on the belt 13 between the lug engaged front wheels 14 and the lug engaged rear wheels 15. The amount of tension in the belt 13 is determined by the horizontal distance between the lug engaged front wheels 14 and the lug engaged rear wheels 15. The lug engaged rear wheels 15 are rotatably mounted about an axle 130, and the lug engaged front wheels 14 are rotatably mounted to an axle 30, as shown in FIG. 5.

Referring now to FIG. 6, the rear track belt tensioner 131 includes a first bracket 182 and a second bracket 133 for supporting a rear track tension cylinder 132. The rear track tension cylinder 132 has a piston rod 190 that is operated to move back and forth and is connected to a rear idler bearing 152, e.g., tapered roller bearing, that interconnects with a rear axle bearing 154, e.g., pillow-block bearing, that is connected to a rear pinion 156 that moves within a rear rack 158. Therefore, when the rear track tension cylinder 132 is extended along the horizontal axis, the rear pinion 156 can move until the rear pinion 156 reaches an adjustable stop 181 and is fully extended rearward to move the lug engaged rear wheels 15 back as far as possible to maximize tension on the belts 13. Likewise, when the rear track tension cylinder 132 is retracted, the rear pinion 156 can move until the rear pinion 156 is fully protracted moving the lug engaged rear wheels 15 forward closer to the lug engaged front wheels 14 to minimize the tension on the belts 13. As shown in FIG. 5, the rear pinion 156 moves a rear idler bearing 152, e.g., tapered roller bearing, rotatably mounted within the rear axle bearing 154, e.g., pillow-block bearing. On the axle 130, the hub 154 is positioned between the electric drive motors 212, 214 and the rear axle bearing 154, e.g., pillow-block bearing, to allow the axle 131 to rotate and drive the belts 13 and yet be moved back and forth horizontally through the rear belt tensioner 131.

Likewise, the front track belt tensioner 31 includes a third bracket 82 and a fourth bracket 33 for supporting a front track tension cylinder 32. The front track tension cylinder 32 has a piston rod 90 that is operated to move back and forth and is connected to a front idler bearing 162, e.g., tapered roller bearing, that interconnects with a front axle bearing 164, e.g., pillow-block bearing, that is connected to a front pinion 166 that moves within a front rack 168. Therefore, when the front track tension cylinder 32 is extended along the horizontal axis, the front pinion 166 can move forward until the front pinion 166 reaches an adjustable stop 81 and is fully extended forward to move the lug engaged front wheels 14 forward as far as possible to maximize tension on the belts 13. Likewise, when the front track tension cylinder 32 is retracted, the front pinion 166 can move until the rear pinion 166 is fully protracted moving the lug engaged front wheels 14 backward closer to the lug engaged front wheels 14 to minimize the tension on the belts 13. As shown in FIG. 5, the front pinion 166 moves a front idler bearing 162, e.g., tapered roller bearing, rotatably mounted within the rear axle bearing 164, e.g., pillow-block bearing. On the axle 30, the hub 54 is positioned between the electric drive motors 216, 218 and the front axle bearing 164, e.g., pillow-block bearing, to allow the axle 30 to rotate and drive the belts 13 and yet be moved back and forth horizontally through the front belt tensioner 31.

The lug engaged front wheels 14 and the lug engaged rear wheels 15 are encapsulated in the rear and front lower suspension brackets 119 and 19, respectively to keep the belts 13 from falling off of the lug engaging wheels 14, 15. The suspension brackets 119 and 19 pivot about the track frame pivot 26 but do not move horizontally with the track tension cylinders 32, 132.

The combination of the suspension cylinders 21, 121 and the track tension cylinders 32, 132 absorb the shock placed on the lug engaged front wheels 14 and the lug engaged rear wheels 15. This shock absorption prevents the belt 13 from tearing and falling off the lug engaged front wheels 14 and the lug engaged rear wheels 15 and also provides a smooth ride.

Referring again to FIGS. 1 and 2, the rear track belt tensioner 131 has the track tension cylinder 132 and the front track belt tensioner 31 has the front track tension cylinder 32. The rear track belt tensioner 131 is mounted to the frame 20 by attaching, e.g., welding, the first bracket 182 and a second bracket 133 for supporting a rear track tension cylinder 132 to the rear, lower suspension bracket 119 and the front track belt tensioner 31 is mounted to the frame 20 by attaching, e.g., welding, the third bracket 82 and the fourth bracket 33 for supporting a front track tension cylinder 32 to the front, lower suspension bracket 19.

The track tension cylinders 32, 132 are hydraulically connected to a tension accumulator 35 via an electronic pressure regulator 208 to provide belt 13 tensioning and a smooth ride. The electronic pressure regulator 208 is electronically connected to a processor 206. The tension accumulator 35 is preferably physically located and mounted between the two track tension cylinders 32, 132. It is important to note that in the preferred embodiment, there is one tension accumulator 35 and two track tension cylinders 132, 32 per belt 13. However, the track tension cylinders 132, 32 could be connected to two separate accumulators. In yet another embodiment, the track tension cylinders 132, 32 and the suspension cylinders 121, 21 are connected to single accumulator among numerous other combinations.

The tension accumulators 135, 35 are hydraulically connected to the track tension cylinders 132, 32 via hoses 136 and 36, respectively. The track tension cylinders 132, 32 are, preferably, a tow large-bore, long-stroke cylinder to provide excellent cushioning and dampening. J. R. Schneider Company is located at 849 Jackson Street, Benicia, Calif., 94510 and provides a suitable cylinder under the name BAILEY330™. Part No. 216-141. Preferably, the tension accumulators 135, 35 are high capacity nitrogen accumulators. The tension accumulators 135, 35 can be purchased from DYNA TECH, A Neff Company, located at 1275 Brume Elk Grove Village, Ill., 60007, and provides a suitable accumulator under Part No. A2-30E-OSG-BTY-MIO. It is obvious to those with ordinary skill in the art that numerous other cylinders and accumulators could be substituted for these specific cylinders and accumulators.

The tension on the belt 13 needs to be set after the belt 13 is assembled on the lug engaged front wheels 14 and the lug engaged rear wheels 15. To set the tension, hydraulic fluid is added to the track belt tensioners 131, 31 until the gauge on the track tension cylinders 132, 32 read a predetermined value, e.g., 10,000 pound per square inch. The tension accumulator 35 is pre-charged to a predetermined value, e.g., 600 pounds per square inch, with nitrogen.

The combination of the suspension system 12 and the track belt tensioners 131, 31 provides independent track suspension. When an object is encountered by the lug engaged wheels 14, 15, the lug engaged front wheels 14 and the lug engaged rear wheels 15 are allowed to move vertically and horizontally because of the suspension system 12 and the track belt tensioners 131, 31, respectively.

Referring now to FIGS. 1, 2 and 4, middle rollers 40 are shown. The middle rollers 40 are rotatably mounted to the frame 20 and fixed; the middle rollers 40 are not capable of moving up and down or back and forth. In the preferred illustrative, but nonlimiting, embodiment, there are eight middle rollers 40 per belt 13. There are four middle rollers 40 along the outside of the belt 13, and there are four middle rollers 40 along the inside of the belt 13. The eight middle rollers 40 are preferably weight bearing and, thus, provide a low ground pressure design and are load bearing rollers. Suitable middle rollers 40 are available through Caterpillar Industrial Products, Inc. under Part No. 120-5746. In arctic use, the ground contacting surfaces of the middle rollers 40 can be coated with rubber. Preferably, under normal conditions, the middle rollers 40 are made with solid rubber. The middle rollers 40 are beveled on one side to match the bevel of the cog of the rubber track. Preferably, each one of the middle rollers 40 are mounted via piston cylinder assemblies 41 to the main frame 25 to apply pressure on the middle rollers 40 when the middle rollers 40 engage the belts 13 through the lugs 18.

Also, carrier rollers 290, e.g., two, may be utilized for further support against the belts 13. In the same manner as the middle rollers 40, each of the carrier rollers 290 are mounted via piston cylinder assemblies 292 to the main frame 25 to apply pressure on the carrier rollers 290 when the carrier rollers 290 engage the belts 13 through the lugs 18.

Referring now to FIGS. 12 and 13, a wheeled-drive embodiment of the present invention is generally indicated by numeral 300 in lieu of tracks. This wheeled-drive system 300 can be identical to that shown in FIGS. 1 and 2 with the use of wheels in lieu of lug engaged wheels 14, 15 and the associated belts 13.

The back, lower suspension bracket 119 has front ends 123 that are operatively connected to a frame 20 of the track driven device 10, e.g., military vehicle, via a back suspension cylinder 121 and a back, upper suspension bracket 122. The back, suspension cylinder 121 has a first end 150 operatively attached to the rear, lower suspension bracket 119 and a second end 151 operatively attached to the rear, upper suspension bracket 122. The rear, upper suspension bracket 119 is operatively also attached to the frame 20. The front, lower suspension bracket 19 has front ends 23 that are operatively connected to a frame 20 of the track driven device 10, e.g., military vehicle, via a front suspension cylinder 21 and a front, upper suspension bracket 22. The front suspension cylinder 21 has a first end 50 operatively attached to the front, lower suspension bracket 19 and a second end 51 operatively attached to the front, upper suspension bracket 22. The front, upper suspension bracket 22 is operatively attached to the frame 20.

The track frame pivot 26 is operatively attached to the main frame 25. The track frame pivot 26 extends from one side of the main frame 25 to the other side for each suspension system 12. The track frame pivot 26 is operatively connected to the main frame 25 via a bearing cup 38 and a bearing cap 39 and includes a rear wing member 75 and a front wing member 76, which are secured by a rear mounting member 78 and a front mounting member 79, respectively. Both wing members 75 and 76 are secured to a vertical support member 80.

Ends of the track frame pivot 26 ride in the bearing cup 38 and the bearing cap 39. To hold the track frame pivot 26 in place, the bearing cap 39 is bolted over the track frame pivot 26 to the bearing cup 38. In the preferred, but nonlimiting, embodiment, the bearing cap 39 and the bearing cup 38 are lined with neoprene rubber. The track frame pivot 26 is preferably a steel bar; however, other materials may be utilized.

There is a rear wheel assembly 82 that relates to the previously described lug engaged rear wheels 15 and front wheel assembly 84 that relates to the previously described lug engaged front wheels 14. The electric drive running gear embodiment 300 can be logically divided into two components. A first component 302 can include a rear wheel assembly 82 and a track frame pivot 26. A second component 304 can include a track frame pivot 26 and the front wheel assembly 84.

Figure 14:
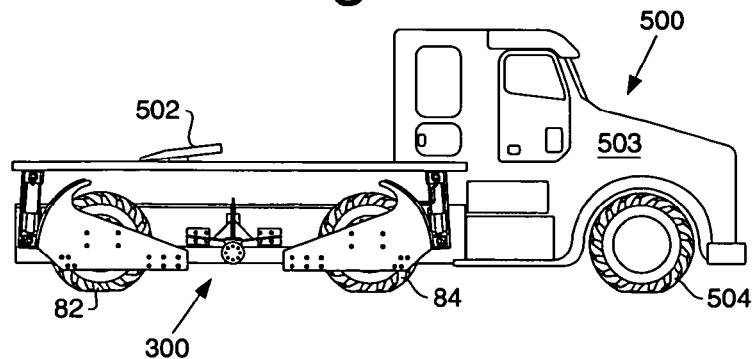
FIG. 14 is a side view of a semi-trailer truck or tractor-trailer having a suspension system, belt tensioner system, and electric drive running gear system is according to FIG. 12 of the present invention.

Referring now to FIG. 14, a tandem tractor-trailer unit is indicated by numeral 500. This includes a truck cab 503 with a front wheel assembly 504. The truck cab 503 is integrally connected to the full wheeled embodiment 300 with both a rear wheel assembly 82 and a front wheel assembly 84, previously shown above in FIGS. 12 and 13. There is a fifth wheel 502 mounted on a platform 506. The rear wheel assembly 82 and a front wheel assembly 84 can be powered by electric drives as previously described above or idler wheels with a convention cab or cab over engine (COE) design (not shown) with the engine being located within the truck cab 503, e.g., gasoline, diesel, electric drive, and so forth.

Figure 15:
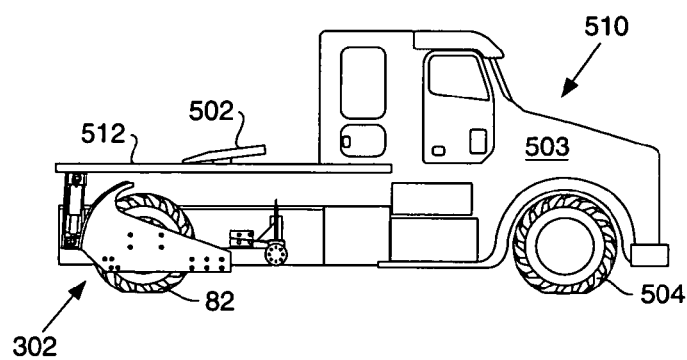
FIG. 15 is a side view of a truck cab with a fifth wheel having a one-half of the suspension system, belt tensioner system, and electric drive running gear system is according to FIG. 12 of the present invention.

Referring now to FIG. 15, a single tractor-trailer unit is indicated by numeral 510. This includes a truck cab 503 with a front wheel assembly 504. The truck cab 503 is integrally connected to the first component 302 can include a rear wheel assembly 82 and a track frame pivot 26, previously shown above in FIGS. 12 and 13. There is a fifth wheel 502 mounted on a shortened platform 512. The rear wheel assembly 82 can be powered by an electric drive as previously described or idler wheels with a convention cab or cab over engine (COE) design (not shown) with the engine, e.g., gasoline, diesel, electric drive, being located within the truck cab 503.

Figure 16:
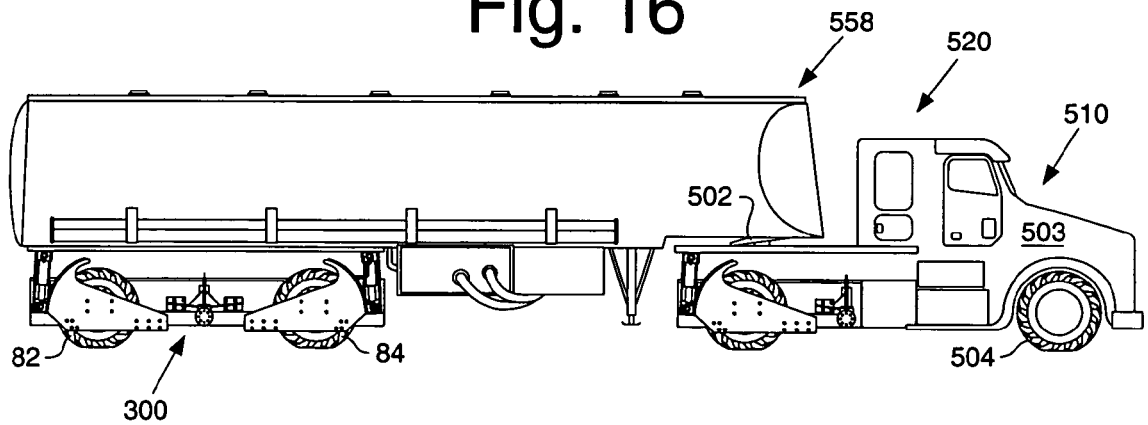
FIG. 16 is a side view of a tanker truck utilizing the truck cab and fifth wheel of FIG. 15 having a suspension system, belt tensioner system, and electric drive running gear system is according to FIG. 12 of the present invention.

Referring now to FIG. 16, a tandem tanker truck 520 is shown that includes the single tractor-trailer unit is indicated by numeral 510 shown in FIG. 15 that is described above. The single tractor-trailer unit 510 that is attached to a tandem tanker trailer assembly 558. The tandem tanker trailer assembly 558 is mounted via a fifth wheel 502 with the full wheeled embodiment 300 with both a rear wheel assembly 82 and a front wheel assembly 84, previously described above with reference to FIGS. 12 and 13.

Figure 17:
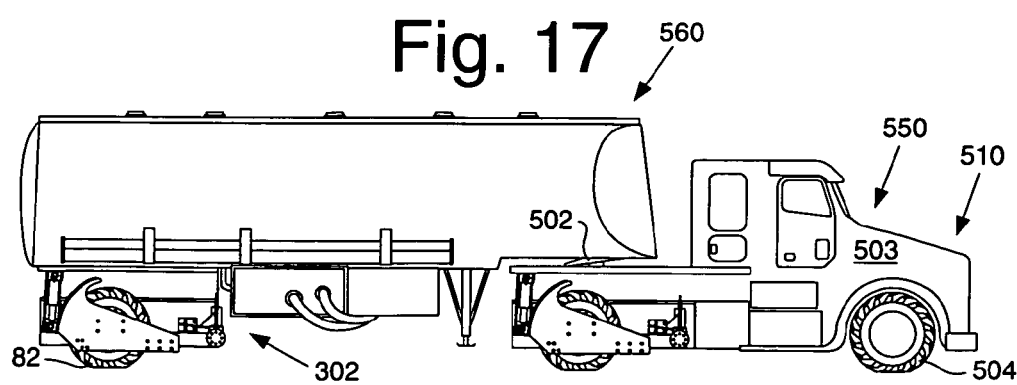
FIG. 17 of a tanker truck utilizing the truck cab and fifth wheel of FIG. 16, wherein the tanker portion of the truck utilizes one-half of the suspension system, belt tensioner system, and electric drive running gear system is according to FIG. 12 of the present invention.

Referring now to FIG. 17, a single tanker truck 550 is shown that includes the single tractor-trailer unit is indicated by numeral 510 shown in FIG. 15 that is described above. The single tractor-trailer unit 510 is attached to a tandem tanker trailer assembly 560. The tandem tanker trailer assembly 560 is mounted via a fifth wheel 502 to the first component 302, which can include a rear wheel assembly 82 and a track frame pivot 26, previously described above with reference to FIGS. 12 and 13.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "have," "having," "includes," and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A military vehicle comprising:
  a turret;
  a gun mounted on the turret;
  a plurality of belts, wherein each of the plurality of belts encompass a front wheel and a rear wheel to provide a positive belt drive system for rotating the belt, wherein the belt has a ground engaging surface and a wheel engaging surface, the wheel engaging surface having lugs thereon for mating with the apertures in the front wheel and the rear wheel such that when at least one of the front wheel or the rear wheel rotates, the belt is positively driven;
  at least one suspension system for absorbing load stresses, wherein the at least one suspension system includes a suspension cylinder that is operatively and pivotably mounted to a military vehicle frame pivot on a main frame of the military vehicle, at least one of the front wheel and the rear wheel rotatably mounted between a first side and a second side of a lower suspension bracket such that when the at least one of the front wheel and the rear wheel encounters an object or depression, the lower suspension bracket moves in a vertical direction and pivots about the track frame pivot thereby allowing the at least one of the front wheel and the rear wheel to move vertically without moving the main frame proportionally vertical, and vertical movement of the least one of the front wheel and the rear wheel is dampened by the suspension cylinder;
  at least one belt tensioning system for maintaining tension on the plurality of belts, wherein the at least one belt tensioning system includes a track tension cylinder operatively mounted between an axle of the at least one of the front wheel or the rear wheel and the main frame, wherein the track tension cylinder maintains tension on the belt by moving the axle of the at least one of the front wheel or the rear wheel in a horizontal direction; and
  at least one electric drive system, wherein the electric drive system includes a plurality of electric drive motors, each electric drive motor is operatively attached to the least one of the front wheel and the rear wheel for rotation of the at least one of the front wheel and the rear wheel and braking when electric power is removed from the plurality of electric drive motors.

2. The military vehicle according to claim 1, wherein the military vehicle includes a tank.

3. The military vehicle according to claim 1, further comprising a plurality of middle rollers rotatably mounted to the main frame and between the front wheel and the rear wheel and extending below the main frame.

4. The military vehicle according to claim 3, wherein the plurality of middle rollers are each operatively connected to piston cylinder assembly.

5. The military vehicle according to claim 1, further comprising a plurality of carrier rollers rotatably mounted to the main frame and between the front wheel and the rear wheel and extending above the main frame.

6. The military vehicle according to claim 1, wherein the plurality of carrier rollers are each operatively connected to piston cylinder assembly.

7. The military vehicle according to claim 1, further comprising a plurality of middle rollers rotatably mounted to the main frame and between the front wheel and the rear wheel and extending below the main frame and a plurality of carrier rollers rotatably mounted to the main frame and between the front wheel and the rear wheel and extending above the main frame.

8. The military vehicle according to claim 1, wherein the front wheel and the rear wheel include sides, the sides having openings therein for allowing foreign objects to pass therethrough.

9. The military vehicle according to claim 1, wherein the front wheel and the rear wheel each include a circumference with retractable paddles that are compressed when a track is positioned around the circumference of the front wheel and the rear wheel and extended when the track is removed for engagement into the earth for movement therein.

10. The military vehicle according to claim 1, wherein each of the at least one suspension system includes a bearing cup and a bearing cap operatively mounted between track frame pivot and the main frame.

11. The military vehicle according to claim 10, wherein the bearing cup and the bearing cap each include inside surfaces for receiving the track frame pivot, and the inside surfaces are lined with neoprene rubber.

12. The military vehicle according to claim 1, wherein the suspension cylinder includes a suspension piston rod at a first end operatively attached to an upper suspension bracket, the upper suspension bracket operatively attached to the main frame, and wherein the suspension cylinder has a distal end operatively attached to the lower suspension bracket such that when the at least one of the front wheel or the rear wheel encounters an object, the suspension cylinder dampens vertical movement of the at least one of the front wheel or the rear wheel.

13. The military vehicle according to claim 12, further includes an accumulator hydraulically connected to the suspension cylinder via a suspension pressure line for providing suspension travel and load support.

14. The military vehicle according to claim 1, further includes a side thrust bearing operatively attached to the lower suspension bracket and an inside support for precluding side bearing thrust movement but allowing vertical movement.

15. The military vehicle according to claim 1, wherein the at least one belt tensioning system includes at least one front pinion movable within at least one front rack, wherein the at least one front pinion is operatively connected to a front axle and a front, lower suspension bracket and wherein the at least one belt tensioning system includes at least one rear pinion movable within at least one rear rack, wherein the at least one rear pinion is operatively connected to a rear axle and the rear, lower suspension bracket.

16. The military vehicle according to claim 15, wherein the front axle can spin freely within a first bearing assembly and the rear axle can spin freely within a second bearing assembly.

17. The military vehicle according to claim 16, wherein the first bearing assembly includes a first pillow-block bearing rotatably interconnected with a first tampered roller bearing and the second bearing assembly second pillow-block bearing rotatably interconnected with a second tampered roller bearing.

18. The military vehicle according to claim 1, further includes a tension accumulator hydraulically connected to the track tension cylinder via a tension pressure line for providing belt tensioning.

19. The military vehicle according to claim 1, wherein the at least one electric drive system includes an electric drive that is electrically connected to an electric motor and the electric drive is electrically connected to at least one generator and at least one controller.

20. The military vehicle according to claim 19, further includes a user interface that is electrically connected to the at least one controller.

21. The military vehicle according to claim 1, wherein each suspension system of the at least one suspension system includes an accumulator that is operatively connected to the suspension cylinder.

22. The military vehicle according to claim 1, wherein each suspension system of the at least one suspension system is operatively connected to a controller that is electrically connected to a processor for controlling the amount of pressure in the suspension cylinder.

23. The military vehicle according to claim 1, wherein each belt tensioning system of the at least one belt tensioning system is operatively connected to a controller that is electrically connected to a processor for controlling the amount of pressure in the track tension cylinder.

24. The military vehicle according to claim 1, wherein a combination of the at least one suspension system and the at least one belt tensioning system operates as a road arm to provide movement in both a vertical and a horizontal direction.

25. The military vehicle according to claim 1, wherein the front wheel and the rear wheel are each attached to a drive system of the at least one drive system through an in-hub connection so that if at least one belt of the plurality of belts were dislodged, mobility of the military vehicle would still be possible.

26. The military vehicle according to claim 1, wherein the front wheel and the rear wheel form a plurality of wheel stations.

27. The military vehicle according to claim 26, wherein the plurality of wheel stations is selected from the group consisting of five wheel stations or six wheel stations.

28. The military vehicle according to claim 2, wherein the turret is a rotatable turret and the gun is a heavy gun.

29. A military vehicle comprising:
a turret;
a gun mounted on the turret;
a plurality of belts, wherein each of the plurality of belts encompass a front wheel and a rear wheel to provide a positive belt drive system for rotating the belt, wherein the belt has a ground engaging surface and a wheel engaging surface, the wheel engaging surface having lugs thereon for mating with the apertures in the front wheel and the rear wheel such that when at least one of the front wheel or the rear wheel rotates, the belt is positively driven;

at least one electric drive system, wherein the at least one electric drive system includes a plurality of electric drive motors, each electric drive motor is operatively attached to the least one of the front wheel and the rear wheel for rotation of the at least one of the front wheel and the rear wheel and braking when electric power is removed from the plurality of electric drive motors;

at least one suspension system for absorbing load stresses, wherein the at least one suspension system having a suspension cylinder that is operatively and pivotably mounted to a military vehicle frame pivot on a main frame of the military vehicle, at least one of the front wheel and the rear wheel rotatably mounted between a first side and a second side of a lower suspension bracket such that when the at least one of the front wheel and the rear wheel encounters an object or depression, the lower suspension bracket moves in a vertical direction and pivots about the track frame pivot thereby allowing the at least one of the front wheel and the rear wheel to move vertically without moving the main frame proportionally vertical, and vertical movement of the least one of the front wheel and the rear wheel is dampened by the suspension cylinder; and at least one belt tensioning system for maintaining tension on the plurality of belts, wherein the at least one belt tensioning system includes a track tension cylinder operatively mounted between an axle of the at least one of the front wheel or the rear wheel and the main frame, wherein the track tension cylinder maintains tension on the belt by moving the axle of the at least one of the front wheel or the rear wheel in a horizontal direction, wherein a combination of the at least one suspension system and the at least one belt tensioning system operates as a road arm to provide movement in both a vertical and horizontal direction.

* * * * *

UNITED STATES PATENT AND TRADEMARK OFFICE
CERTIFICATE OF CORRECTION

PATENT NO. : 7,641,006 B2
APPLICATION NO. : 11/457387
DATED : January 5, 2010
INVENTOR(S) : Timothy R. Scheetz Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 571 days.

Signed and Sealed this

Sixteenth Day of November, 2010

David J. Kappos
*Director of the United States Patent and Trademark Office*